(12) United States Patent
Ng et al.

(10) Patent No.: US 11,254,825 B2
(45) Date of Patent: Feb. 22, 2022

(54) CONDUCTIVE PASTES USING BIMODAL PARTICLE SIZE DISTRIBUTION

(71) Applicant: CN Innovations Limited, Hong Kong (CN)

(72) Inventors: Ka Ming Ng, Hong Kong (CN); Sze Kee Tam, Hong Kong (CN); Ka Yip Fung, Hong Kong (CN)

(73) Assignee: CN INNOVATIONS LIMITED, Hong Kong (CN)

( * ) Notice: Subject to any disclaimer, the term of this patent is extended or adjusted under 35 U.S.C. 154(b) by 60 days.

(21) Appl. No.: 16/279,409

(22) Filed: Feb. 19, 2019

(65) Prior Publication Data

US 2019/0177555 A1    Jun. 13, 2019

Related U.S. Application Data

(62) Division of application No. 15/071,495, filed on Mar. 16, 2016, now Pat. No. 10,208,211.

(60) Provisional application No. 62/284,036, filed on Sep. 18, 2015.

(51) Int. Cl.

| | |
|---|---|
| *H01B 1/20* | (2006.01) |
| *B22F 1/00* | (2006.01) |
| *C09D 5/24* | (2006.01) |
| *H01B 1/22* | (2006.01) |
| *B22F 9/24* | (2006.01) |

(52) U.S. Cl.
CPC .............. *C09D 5/24* (2013.01); *B22F 1/0022* (2013.01); *B22F 9/24* (2013.01); *H01B 1/20* (2013.01); *H01B 1/22* (2013.01)

(58) Field of Classification Search
CPC .... B22F 1/0007; B22F 1/0011; B22F 1/0014; B22F 1/0018; B22F 1/0022; B22F 9/24; B22F 1/0003; B22F 1/0044; C22B 15/0008; H01B 1/02; H01B 1/20; H01B 1/22

See application file for complete search history.

(56) References Cited

U.S. PATENT DOCUMENTS

2007/0034841 A1    2/2007  Satou et al.

FOREIGN PATENT DOCUMENTS

CN    101693297 A    *    4/2010

OTHER PUBLICATIONS

Machine Translation of CN101693297.*

* cited by examiner

*Primary Examiner* — Haidung D Nguyen
(74) *Attorney, Agent, or Firm* — Nath, Goldberg & Meyer; Jerald L. Meyer

(57) ABSTRACT

Monodispersed metal nanoparticles are prepared by preparing a homogeneous metal complex solution by mixing metal salt with a complexing agent in solvent. A precipitating agent is added into the homogeneous metal complex solution to form a slurry. A homogeneous mixture of reducing agent and solvent is added to perform reducing reaction on the slurry to form metal nanoparticles in a controlled environment under gas purge. A capping agent is added to modify surface properties of metal nanoparticles. The metal nanoparticles are washed and the metal nanoparticles are recovered by phase extraction or centrifugation. The technique can be used to prepare conductive pastes with bimodal particle size distribution.

14 Claims, 3 Drawing Sheets

CONDUCTIVE PASTES USING BIMODAL PARTICLE SIZE DISTRIBUTION

RELATED APPLICATION

This is a Divisional Application of U.S. patent application Ser. No. 15/071,495, filed Mar. 16, 2016, an application claiming benefit from Provisional Application No. 62/284,036, filed Sep. 18, 2015, which is assigned to the assignee hereof and filed by the inventors hereof and which is incorporated by reference herein.

BACKGROUND

Field

The disclosed technology relates to a conductive copper paste for forming conducting interconnects, tracks or coating on various substrates.

Background

Conductive pastes are widely used in printed electronics; and the conductivity of the printed films highly depends on the conductive fillers used in the paste. Copper, with its high conductivity, is commonly used as filler, but it is easily oxidized to form copper oxide, which has a conductivity one millionth to that of copper. To prevent copper from oxidizing, copper particles are passivated by a coating, which is removed during sintering.

The filler's size and morphology also influences the product quality and processing conditions. For a paste containing micron-sized or finer copper flakes as fillers, sintering has to be conducted at a high temperature under an inert environment. This makes thermally-sensitive material not suitable to be used as substrate. Copper nanoparticles exhibiting melting point depression allows the paste to be sintered at a lower temperature. The melting point depression allows a thermally-sensitive substrate to be used; however, the printed film has a high tendency to crack. Copper flakes are also preferred over spherical particles as flakes provide more contacting points among fillers for conduction.

For synthesizing copper nanoparticles for paste production, chemical reduction can be applied to produce monodispersed nanoparticles. Different copper sources and reagents are used to produce nanoparticles in different sizes. To prevent metal nanoparticles from aggregating and oxidizing, the nanoparticles can be coated with a hydrophobic (US 2008/0138643) or hydrophilic (US 2007/0180954) capping agent. The capping process is conventionally obtained by pre-mixing excess capping agent with a metal precursor to form a homogeneous solution, followed by reduction. The existing process is characterized by a low product concentration (100 mM) and low recovery. It is often not feasible to change the capping agent.

SUMMARY

Conductive pastes are formed with bimodal particle size distribution. Micron-sized or finer metal fillers and metal nanoparticles with mass ratio ranging from 1:0.05 to 1:20 are dispersed in a low boiling point solvent to form a suspension. A binder is added to a high boiling point solvent to form a binder matrix. Fillers suspension is added into the binder matrix to form a paste precursor. The paste precursor is brought at an elevated temperature to remove the low boiling point solvent to obtain a paste with bimodal particle size distribution.

In one non-limiting example, the viscosity of the paste ranges from 50 cP to 500,000 cP.

DETAILED DESCRIPTION

Overview

Figure 1:
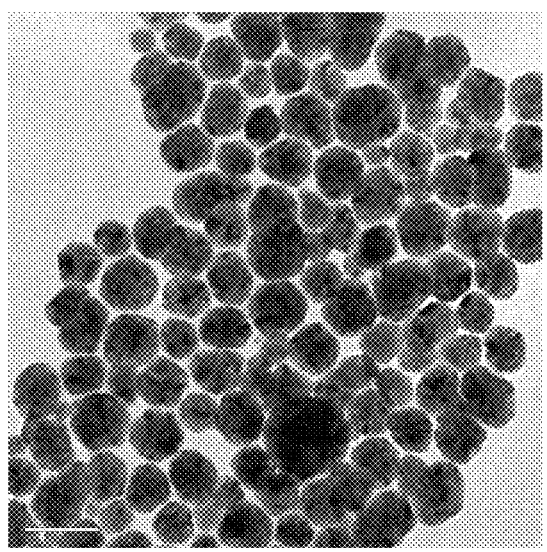
FIG. 1 is a transmission electron microscope (TEM) image of the copper nanoparticles prepared in Example 1.

The disclosed technology relates to a method for preparing a conductive paste with bimodal particle size distribution, in which the mixture contains 5 to 60 wt % of micron sized or finer metal flakes and 40 to 95 wt % of metal nanoparticles. In a particular non-limiting example the mixture can contain 5 to 40 wt % of micron sized or finer metal flakes and 60 to 90 wt % of metal nanoparticles. In a non-limiting example, both the metal flakes and the metal nanoparticles are copper, so the mixture contains 5 to 60 wt % of micron sized or finer copper flakes in the range of 5 nm to 1000 nm, and 40 to 95 wt % of copper nanoparticles. The copper flakes may, by way of non-limiting example, be provided as filler particles with a particular shape, as will be described. The disclosed technology uses metal flakes, such as copper flakes, prepared by grinding the metal precursor with a process-controlling agent.

In addition to copper, the process may be used using other conductive materials, such as Ag, Au, Al, Ni, Sn, Zn, Si, as well as Cu and their alloys. It is also contemplated that a mixture of metals will be used, e.g., a mixture of flakes and a mixture of nanoparticles, or a bi-metallic mixture of one type of metal flake and another type of nanoparticle.

In particular non-limiting examples, the copper flakes are provided as monodispersed metal nanoparticles in a range of 5 nm to 1000 nm and in particular in a range of 30 nm to 80 nm. Non-limiting examples of micron-sized or finer copper fillers can comprise copper shaped in flakes, platelets; sized in a range of 1 μm to 1000 μm with aspect ratio range of 2 to 30.

Metal nanoparticles are prepared by first mixing the metal complex solution with a precipitating agent to form a slurry, followed by reacting the slurry with a reducing agent at room temperature. The disclosed technology also provides a method to change the capping agent of the metal nanoparticles for providing anti-oxidation and hydrophobicity properties. The metal flakes and nanoparticles are then mixed to form the conductive paste.

The method involves producing a conductive paste with both metal flakes and nanoparticles as fillers. This use of nanoparticles allows the paste to be sintered at a much lower temperature (e.g., 120° C.) under hydrogen or nitrogen environment. Besides thermal sintering, intense pulsed light (IPL) or laser sintering that heat up the metal film to the sintering temperature while keeping the substrate intact can be used as well. With the bimodal particle size distribution in the paste, metal flakes retain the film structure during sintering to minimize crack formation, while metal nanoparticles melt at a lower temperature to form the interconnects among the flakes for electrical conduction, without damaging the temperature sensitive substrate.

The disclosed technology also provides a technique for synthesizing metal nanoparticles through liquid phase reduction, with the objective to improve product concentration (1 M), reduce the excessive use of capping agent, and improve product recovery (up to 98 wt %). The disclosed technology also provides a method to prepare micron-sized or finer metal flakes in the range of 5 nm to 1000 nm. The flakes are prepared by grinding metal powders in a mechanical miller, such as a high-energy ball mill. The size and morphology of the flakes are controlled by the amount of process controlling agent and the milling time.

In a non-limiting example, the disclosed technology can be implemented in a three-step manufacturing process developed for formulating the conductive paste with bimodal particles, including copper flakes and copper nanoparticles:

Step 1: Preparation of copper nanoparticles
Step 2: Preparation of copper flakes
Step 3: Preparation of copper paste.

While copper is described, the process may be used using other conductive materials, such as Ag, Au, Al, Ni, Sn, Zn, Si as well as Cu and their alloys, as described above. As described above, it is also contemplated that a mixture of metals will be used, e.g., a mixture of flakes and a mixture of nanoparticles, or a bi-metallic mixture of one type of metal flake and another type of nanoparticle.

Step 1: Preparation of Copper Nanoparticles

A process is provided for preparing monodisperse copper nanoparticles in high product concentration, high recovery and allowing the feasibility to change the capping agent. The process includes the following steps:

prepare a homogeneous copper complex solution;
add precipitating agent to the homogeneous solution to form a slurry;
perform reduction reaction on the slurry to form copper nanoparticles;
modify copper nanoparticles surface by adding capping agent; and
wash and recover the copper nanoparticles by phase extraction or centrifuge.

The size of the synthesized monodispersed copper nanoparticles are considered in the micron range or finer, specifically ranging from 5 nm to 1000 nm (1 µm), and in particular from 70 nm to 80 nm. The copper nanoparticles are oxidation resistant and can be dispersed in either polar or nonpolar solvent. The different sizes of nanoparticles are produced by changes in precipitating agents and the relative concentration of the metal in the resultant slurry.

Step 2: Preparation of Copper Flakes

A process is provided for preparing copper flakes in high product concentration and allows the feasibility to change the capping agent used for preparing copper nanoparticles. It includes the following steps:

mix and grind process controlling agent with copper powder to generate copper flakes; and
wash and recover copper flakes by phase extraction, centrifuge, or filtration.

The size of the synthesized copper flakes ranged from 1 µm to 1000 µm, and in particular from 5 to 20 µm. The copper flakes are oxidation resistant and can be dispersed in either polar or nonpolar solvent.

Step 3: Preparation of Copper Paste

A process is provided for preparing copper paste:
prepare fillers by mixing copper nanoparticles and copper flakes;
prepare a polymer matrix; and
mix the polymer matrix and fillers to form the conductive paste.

The viscosity of the paste is controlled between 50 cP to 500,000 cP, and in particular from 100,000 to 300,000 cP, for screen printing application. The printed copper film can be sintered by thermal sintering under nitrogen, IPL sintering or laser sintering. The paste can be printed on various substrates including polyethylene terephthalate, polyimide, polypropylene.

Example Process

In a non-limiting example, a three-step method for formulating conductive paste with copper nanoparticles and copper flakes is disclosed.

Step 1: Preparation of Copper Nanoparticles

The disclosure relates to a method for producing copper nanoparticles. The method includes preparing a copper complex solution, adding precipitating agent to the solution to form a slurry, performing a reducing reaction on the slurry to form copper nanoparticles, recovering the copper nanoparticles by phase extraction, and washing the copper nanoparticles. The final copper nanoparticles are either hydrophobic or hydrophilic, which are readily dispersed in solvent.

First, a homogeneous copper complex solution is prepared. Transition copper salts with single or multiple valence, e.g., copper (I) ion, copper (II) ion and counter anion solutions providing a reducing agent that is capable of reducing the metal ions. Non-limiting examples of counter ions comprise nitrate ion, sulfate ion, sulfite ion, carbonate ion, bicarbonate ion, chloride ion, fluoride ion, bromide ion, acetate ion, propionate ion, are premixed with complexing agent, e.g., tartaric acid, oxalic acid, citric acid, ammonia, methylamine, ethylamine, propylamine, isobutylamine; phosphine, methylphosphine, ethylphosphine, propylphosphine, butylphosphine; a carboxylic acid such as methanoic acid, ethanoic acid, propanoic acid, butaonic acid; a dicarboxylic acid such as adiptic acid; alkathiol, methyl thiol, ethyl thiol, propyl thiol; or a mixture of complexing agent in solvent, e.g., an alcohol such as methanol, ethanol, isopropyl alcohol; a ketone such as acetone, butanone, pentanone, methyl ethyl ketone; a nitrile such as acetonitrile, propionitrile; a glycol such as ethyl glycol, diethylene glycol; water; or a mixture of solvents to form a homogeneous copper complex solution.

The copper complex solution is mixed with precipitating agent, e.g., lithium hydroxide, sodium hydroxide, potassium hydroxide; an inorganic salt such as sodium carbonate, sodium bicarbonate, sodium phosphate, sodium triphosphate; an organic salt such as sodium oxalate, sodium adipate; or a mixture of precipitating agents to form a slurry containing copper ions. The amount of precipitating agent added is determined by the desired product specifications, in terms of average particle size, and process production rate.

The slurry is subjected to a reducing reaction in a controlled environment to form copper nanoparticles. The reduction reaction is achieved by adding reducing agent, e.g., sodium borohydride, sodium aluminum hydride, potassium borohydride, potassium aluminum hydride, hydrazine, methylhydrazine, hydroxyzine, methanol, ethanol, propanol, ethylene glycol, propylene glycol; reducing sugar, glucose, glyceraldehyde, galactose, a mixture of the reducing agent, into the copper-containing slurry to reduce the copper source to form copper nanoparticles under inert gas, e.g., argon or nitrogen atmosphere at a temperature ranged from 25° C. to the boiling point of the solvent. Non-limiting examples of the controlled environment include an environment with controlled temperature range from room temperature to the boiling point of the solvent, and controlled pressure ranged from 0.5 atm to 4 atm.

After the reaction, a capping agent, e.g., nonanoic acid, decanoic acid, unidecanoic acid, dodecanoic acid, hexanethiol, pentathiol, heptanethiol, octanethiol, nonanethiol, decanethiol, trioctylphosphine oxide, decylamine oxide, undecylamine oxide, dodecylamine oxide; methyl decyl betaine, sodium deaconate, a polymeric capping agent such as sodium carboxymethyl cellulose, sodium alginate, poly(acrylic acid sodium salt), or a mixture of capping agents, is added to the reaction mixture.

After centrifugation, the nanoparticles are obtained and repeatedly washed by washing solvent, e.g., methanol, ethanol, isopropyl alcohol, acetone, butanone, pentanone, methyl ethyl ketone, acetonitrile, propionitrile; water, hexane, heptane, octane, nonane, decane, ethylene glycol or a mixture of solvent.

The synthesized copper nanoparticles are stable without oxidation, and the developed process is highly reproducible.

Step 2: Preparation of Copper Flakes

The disclosure relates to a method to produce copper flakes. The copper powders are mixed and grind with a process controlling agent to form copper flakes, followed by washing and recovering the copper flakes by phase extraction, centrifuge, or filtration.

Copper powder with a size ranging from 10 m to 500 µm is pre-mixed with the process controlling agent, e.g., nonanoic acid, decanoic acid, unidecanoic acid, dodecanoic acid, hexanethiol, pentathiol, heptanethiol, octanethiol, nonanethiol, decanethiol, trioctylphosphine oxide, decylamine oxide, undecylamine oxide, dodecylamine oxide; methyl decyl betaine, sodium deaconate, a polymeric capping agent such as sodium carboxymethyl cellulose, sodium alginate, poly(acrylic acid sodium salt), or a mixture of capping agents. The mixture is then ground in a milling machine, e.g., jaw crushing, dry ball milling, or hammer milling.

The milled powders are washed in a solvent, e.g., methanol, ethanol, isopropyl alcohol, acetone, butanone, pentanone, methyl ethyl ketone, acetonitrile, propionitrile; water, hexane, heptane, octane, nonane, decane, ethylene glycol or a mixture of solvents. After each washing step, the powders are recovered by sedimentation, centrifugation, or filtration. The milled powders are finally suspended in a solvent, e.g., methanol, ethanol, isopropyl alcohol, acetone, butanone, pentanone, methyl ethyl ketone, acetonitrile, propionitrile; water, hexane, heptane, octane, nonane, decane, ethylene glycol or a mixture of solvents, for subsequent process. The amount of process controlling agent and the milling time are key controlling parameters.

Step 3: Preparation of Conductive Paste

The disclosed technology provides a method for producing conductive paste with bimodal particle size distribution. With copper nanoparticles and copper flakes ready as fillers, a polymer matrix is first prepared and mixed with the fillers to form a conductive paste.

Copper paste is prepared by first mixing copper flakes, ranging from 1 µm to 1000 µm and preferably from 5 to 20 µm, and copper nanoparticles, ranging from 5 nm to 1000 nm and preferably from 70 nm to 80 nm, followed by dispersing them in low boiling point solvent.

Non-limiting examples of low boiling point solvent are solvents with a boiling point in the range of 70° C. to 90° C. By way of non-limiting example, the solvent may comprise methanol, ethanol, isopropyl alcohol, acetone, butanone, pentanone, methyl ethyl ketone, acetonitrile, propionitrile; water, hexane, heptane, octane, nonane, decane, ethylene glycol or a mixture of solvents. Further non-limiting examples of low boiling point solvents have a slightly more elevated temperature, for example, solvent with a boiling point in a range of 150° C. to 250° C. selected from the group consisting of at least one of terpineol, toluene, glycol ether, texanol, tetradecane, glycerol and tripropylene glycol, butyl carbitol, and 1 phenoxy 2 propanol, water or a mixture.

The ratio of copper flakes and copper nanoparticles can be ranged from 1:0.05 to 1:20, as a mole ratio. By way of non-limiting example, a particular range of ratios (molar) is 1:0.05 to 1:4. The polymeric matrix is prepared by adding polymer e.g., methyl cellulose, ethyl cellulose, polyvinyl alcohol, polyvinyl acetate, polyvinylpyrrolidone into high boiling point solvent, e.g., terpineol, ethylene ether. The polymeric matrix is then added to the dispersion. The ratio of polymeric matrix to the filler loading can be ranged from 60 wt % to 99 wt %, and in particular from 75 wt % to 85 wt %. Finally, the mixture is stirred in a planetary centrifugal mixer, followed by heating up to remove any low boiling point solvent contained in the paste.

Non-limiting examples are given below to demonstrate the method in the disclosed technology:

Example 1

First, 3.1 g of copper (II) acetate monohydrate was mixed with 1.9 mL of 28 wt % ammonia solution in 6 mL of water. After homogenous solution was formed, 2.7 mL of 30 wt % sodium hydroxide solution was added to form a slurry with 1 M copper content. Next, 3.4 mL of 60 wt % hydrazine solution was added to the reaction medium under stirring at room temperature and nitrogen purge. After 30 min, the solution became shinny brown, then 3 mL of dodecanethiol as capping agent was added to the reaction mixture. The capped nanoparticles floated on the surface of the mixture. After centrifugation, the nanoparticles were washed with 10 mL of water twice and 5 mL of hexane twice. Finally, the nanoparticles were dried in a vacuum oven. The TEM image of the copper nanoparticles in this example is shown in FIG. 1.

Example 2

Figure 2:
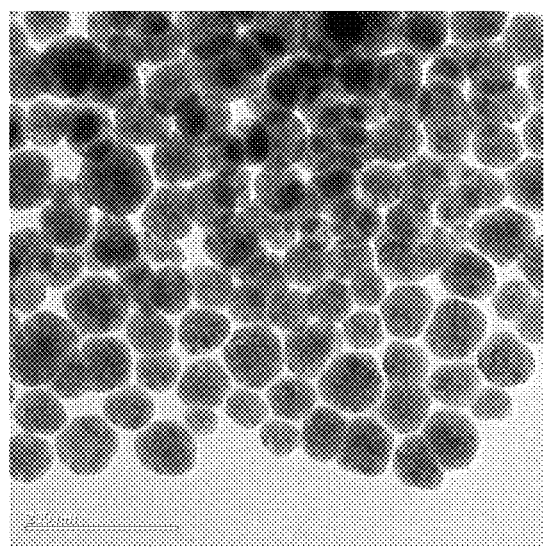
FIG. 2 is a TEM image of the copper nanoparticles prepared in Example 2.

First, 2.4 g of copper (II) acetate monohydrate was mixed with 4 mL of 28 wt % ammonia solution in 4 mL of water and 4 mL of ethanol. After a homogenous solution was formed, 3.4 mL of 30 wt % sodium hydroxide solution was added to form a slurry with 1 M copper content. Next, 4.6 mL of 60 wt % hydrazine solution was added to the reaction medium under stirring at room temperature and nitrogen purge. After 30 mmin, the solution became shinny brown. One gram of lauric acid as capping agent was then added to the reaction mixture and the solution was heated up to 70° C. After centrifugation, the nanoparticles were washed with 10 mL of water twice, 5 mL of ethanol twice and 5 mL of hexane twice. Finally, the nanoparticles were dried in a vacuum oven. The TEM image of the copper nanoparticles in this example is shown in FIG. 2.

Example 3

Figure 3:
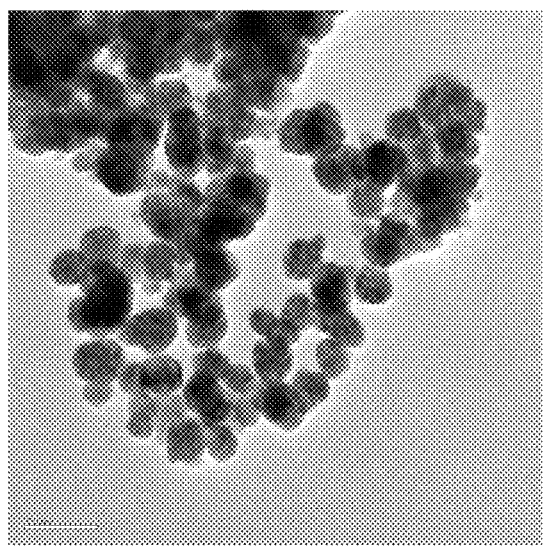
FIG. 3 is a TEM image of the copper nanoparticles prepared in Example 3.

First, 2 g of copper (II) acetate monohydrate was mixed with 1.2 mL of 28 wt % ammonia solution and 4 mL of water. After a homogenous solution was formed, 1.8 mL of 40 wt % potassium hydroxide solution was added to form a slurry with 1 M copper content. Next, 2.3 mL of 60 wt % hydrazine solution was added to the reaction medium under stirring at room temperature and nitrogen purge. After 30 min, the solution became shinny brown. One milliliter of 2 M poly(acrylic acid sodium salt) (MW 10K) solution as capping agent was then added to the reaction mixture. One milliliter of ethanol was added to the solution and stirred for 5 minutes After centrifugation, the nanoparticles were washed with a mixture containing 10 mL of water and 5 mL of ethanol twice. Finally, the nanoparticles were dried in a vacuum oven. The TEM image of the copper nanoparticles in this example is shown in FIG. 3.

Example 4

First, the copper flakes were obtained by milling method. Copper powder (8 g) was pre-mixed with 40 mg of decanoic acid, which served as the process controlling agent. The mixture was then ground in a planetary ball-mill using 40 g of zirconium oxide balls with a diameter of 0.5 cm at 250 rpm, with direction reversal every 10 minutes, for 6 hours. The milled powders were washed in 30 mL of methanol three times. After each washing, the powders were recovered by centrifugation at 8,000 rpm for 5 minutes.

Next, copper nanoparticles were prepared by chemical reduction method. First, 2.4 g of copper (II) acetate monohydrate was mixed with 4 mL of 28 wt % ammonia solution in 4 mL of water and 4 mL of ethanol. After homogenous solution was formed, 3.4 mL of 30 wt % sodium hydroxide solution was added to form a slurry with 1 M copper content. Next, 4.6 mL of 60 wt % hydrazine solution was added to the reaction medium under stirring at room temperature and nitrogen purge. After 30 min, the solution became shinny brown. One gram of lauric acid as capping agent was then added to the reaction mixture and the solution was heated up to 70° C. After centrifugation, the nanoparticles were repeatedly washed with 10 mL of water twice and 5 mL of ethanol twice.

Figure 4:
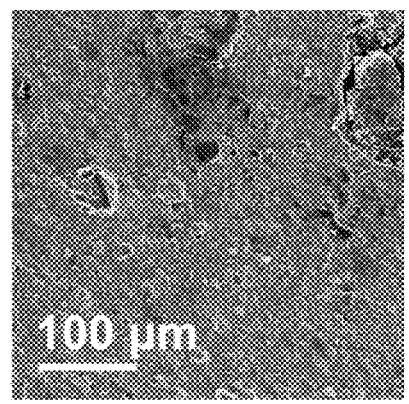
FIG. 4 is a scanning electron microscope (SEM) image of intense pulsed light (IPL) sintered copper film with 80 wt % Cu nanoparticles and 20 wt % Cu flakes.
Figure 5A:
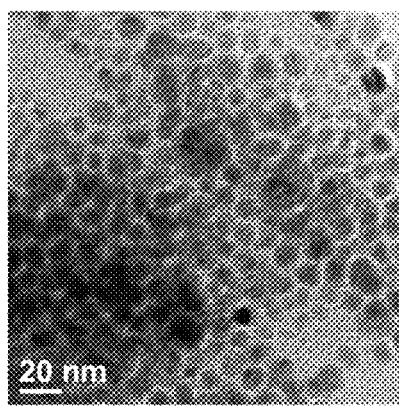
FIGS. 5A-5F are TEM images showing the morphology of samples of copper nanoparticles.
Figure 5B:
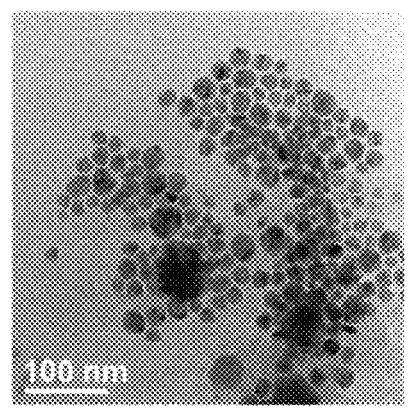
Figure 5C:
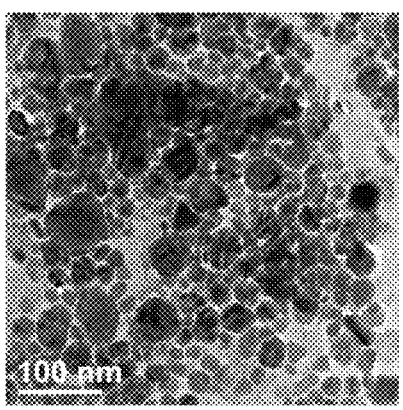
Figure 5D:
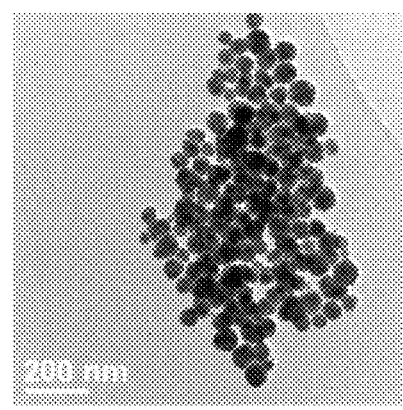
Figure 5E:
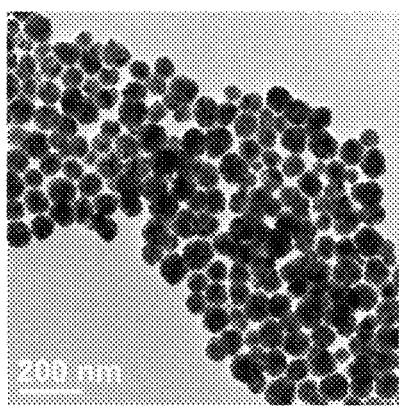
Figure 5F:
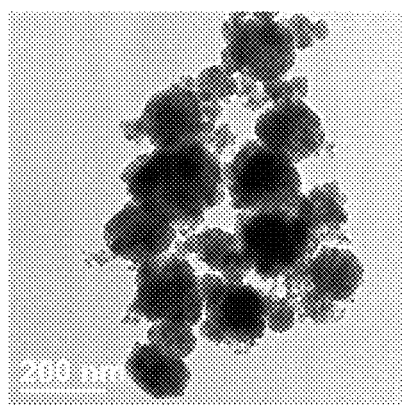

Copper paste was prepared by first mixing 20 wt % of 9.3 μm copper flakes and 80 wt % of 60 nm copper nanoparticles, being dispersed in methanol. The polymeric matrix was prepared by adding 1 g of ethyl cellulose into 44 g of terpineol. Next, 0.65 g of polymeric matrix was added to the particle dispersion, such that the filler loading was 75 wt %. The mixture was stirred in a planetary centrifugal mixer (Thinky Mixer AR-100) at 2,000 rpm for 2 min, followed by heating at 40° C. for 1 hour to remove any methanol remaining in the paste. The prepared copper paste was applied on a PET transparent film by a screen-print mesh (200 mesh) with a rectangular pattern (5 mm×15 mm). Before screen-printing, the paste was mixed in a planetary centrifugal mixer. The printed pattern was then dried in a vacuum oven at 50° C. for 30 minutes, followed by thermal or IPL sintering. For thermal sintering, the films were placed in a furnace (MTI GSL-1700X) at 120° C. with a continuous purge of $H_2$ and $N_2$ in a ratio of 5:95 and at a flowrate of 100 mL/min for 3 hours. For IPL sintering (Xenon SINTERON 500), the sample was covered with a 1 mm thick glass and the sample was placed 2 cm below the xenon lamp with a pulse energy of 510 J and a pulse duration of 5 ms. The SEM image of IPL sintered copper film with 80 wt % Cu nanoparticles and 20 wt % Cu flakes is shown in FIG. 4.

The results of the resistivity test are as follows:

TABLE 1

| | | Thermal sintering | | IPL sintering | |
|---|---|---|---|---|---|
| Cu flakes (wt %) | Cu NP (wt %) | Thickness of printed film (μm) | Sheet resistance (mΩ/sq) | Thickness of printed film (μm) | Sheet resistance (mΩ/sq) |
| 20 | 80 | 6.21 ± 0.60 | 47 ± 1 | 6.20 ± 0.30 | 46 ± 1 |

Test Run

Figure 6:
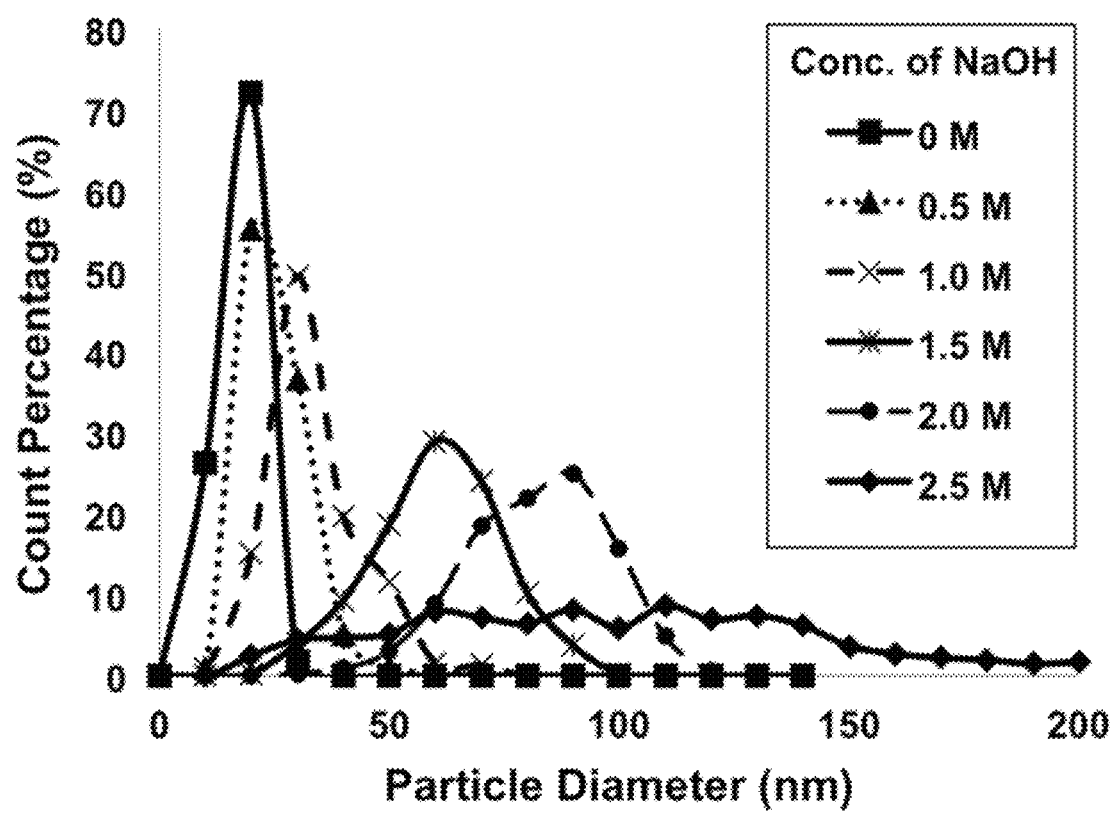
FIG. 6 is a graphical depiction of particle size distribution for copper nanoparticles synthesized by precursors.

A test run using the disclosed techniques was performed, with the results depicted in FIGS. 5 and 6. FIGS. 5A-5F are TEM images showing the morphology of samples of copper nanoparticles. The copper nanoparticles were synthesized from a precursor with 1 M $CuOAc_2$ and 2 M $NH_4OH$. FIG. 5A shows copper nanoparticles synthesized from precursor with without NaOH. FIG. 5B shows copper nanoparticles synthesized from precursor with with NaOH at 0.5 M. FIG. 5C shows copper nanoparticles synthesized from precursor with with NaOH at 1.0 M. FIG. 5D shows copper nanoparticles synthesized from precursor with with NaOH at 1.5 M. FIG. 5E shows copper nanoparticles synthesized from precursor with with NaOH at 2.0 M. FIG. 5F shows copper nanoparticles synthesized from precursor with with NaOH at 2.5 M.

FIG. 6 is a graphical depiction of particle size distribution for copper nanoparticles synthesized by a precursor with 1 M $CuOAc_2$, 2 M $NH_4OH$ at the various NaOH concentrations of FIGS. 5A-F.

The following materials were used in the test run: Copper (II) acetate monohydrate, 1-dodecanethiol, nonanoic acid, lauric acid, dodecylamine, methanol, sodium polyacrylate ($M_w$=10,000), polyvinylpyrrolidone ($M_w$=10,000), potassium hydroxide, ethyl cellulose, terpineol and 55 wt % hydrazine solution were obtained from Sigma Aldrich. A 28 wt % ammonium solution was obtained from Wako. Sodium hydroxide was obtained from BDH. Ethanol was obtained from Mallinckrodt chemicals. Hexane was obtained from Merck Millipore. Chloroform was obtained from Scharlau. Deionized water was purified with Millipore Milli-Q-UF Plus to a resistivity greater than 18 MΩ/cm.

Synthesis and Surface Passivation of Copper Nanoparticles

Synthesis and surface passivation of copper nanoparticles was performed. The reaction conditions for preparing eleven samples of copper nanoparticles are summarized in Table 2. A typical synthesis procedure for sample 2 in Table 2, was as follows: Two grams of copper (II) acetate monohydrate was added into a solution of 1.2 g of 28 wt % aqueous ammonia and 4.8 mL of water to form a royal blue solution. Next, 0.5 mL of 10 M sodium hydroxide solution was added to form a slurry with pale blue precipitate. Next, 2.3 mL of 55 wt % aqueous hydrazine solution was added into the reaction medium with vigorous stirring at room temperature under a nitrogen atmosphere for 15 minutes. Copper nanoparticles are then passivated with an organic compound and the detailed procedure is described in the next section. The same reaction procedure described above was used to prepare other nanoparticles by varying the amounts of sodium hydroxide. TEM images in FIGS. 5A-5F show the morphology of these copper nanoparticles except for sample 5.

For the preparation of hydrophobic copper nanoparticles, a passivating solution, which was prepared by adding 0.8 g dodecylamine and 1 mL nonanoic acid in 1 mL of methanol, was added to the copper nanoparticles formed. The mixture was stirred vigorously for 1 hour under nitrogen. Next, 5 mL of water was added. After settling for a while, the copper nanoparticles floated to the top of the solution. Next, the bottom aqueous phase was discarded and 10 mL of water was added into the sample with gentle mixing to further dissolve the residual salt. After discarding the aqueous phase, the following steps can be performed under ambient conditions: The settling step was repeated and the aqueous phase was discarded again. Next, 10 mL of methanol was added to the sample. After that, the copper nanoparticles are recovered by centrifugation at 15,000 rpm for 5 minutes. After discarding the liquid, the nanoparticles are dried under vacuum at room temperature for 10 hours. To prepare lauric acid-capped copper nanoparticles, the nonanoic acid was simply replaced by a mixture of lauric acid. For the preparation of dodecanethiol-capped particles, 1-dodecanethiol was used instead of the mixture of dodecylamine and nonanoic acid.

For the preparation of hydrophilic copper nanoparticles, 0.5 mL of sodium polyacrylate solution (4 M, in terms of monomer unit) was added to the copper nanoparticles formed under gentle mixing. Next, 1 mL of methanol was added to the solution. The mixture was stirred vigorously for 1 hour under nitrogen. After settling, the copper nanoparticles settled on the bottom and the liquor was discarded. After discarding the liquor, the followings step can be performed under ambient condition. The nanoparticles are then re-dispersed in water and precipitated with methanol again. The copper nanoparticles are recovered from centrifugation at 15,000 rpm for 5 minutes. Finally, the liquor was discarded and the nanoparticles are dried under vacuum at room temperature for 10 hours. The passivating agent could be replaced by a polyvinylpyrrolidone (PVP) solution (4 M, in terms of monomer unit) to generate PVP-capped copper nanoparticles.

Table 2 shows the copper nanoparticles passivated with different passivating agents.

TABLE 2

Synthesis conditions for the preparation of copper nanoparticle synthesized from the precursors with 1M CuOAc$_2$ and 2M NH$_4$OH

| | Condition | | Attributes of Particles | |
|---|---|---|---|---|
| Sample | Sodium Hydroxide (M) | Capping Agent | Mean Particle Diameter (nm) | Standard Deviation (nm) |
| 1 | 0 | NA and DAm | 12.0 | 3.2 |
| 2 | 0.5 | NA and DAm | 20.9 | 7.2 |
| 3 | 1.0 | NA and DAm | 28.4 | 10.3 |
| 4 | 1.5 | NA and DAm | 55.5 | 13.9 |
| 5 | 1.8 | NA and DAm | 62.0 | 12.0 |
| 6 | 2.0 | NA and DAm | 77.4 | 15.3 |
| 7 | 2.5 | NA and DAm | 98.9 | 50.1 |
| 8 | 1.8 | DDT | 63.6 | 12.7 |
| 9 | 1.8 | LA and DAm | 64.2 | 11.2 |
| 10 | 1.8 | PAA | 64.1 | 12.4 |
| 11 | 1.8 | PVP | 63.8 | 10.2 |

Abbreviations:
NA: Nonanoic acid;
DAm: Dodecylamine;
DDT: 1-Dodecanethiol;
LA: Lauric acid;
PAA: Polyacrylic acid (10K); and PVP: Poly vinyl pyrrolidone (10K)

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method for preparing metal nanoparticles, comprising:
preparing a homogeneous metal complex solution by mixing metal salt with a complexing agent with a mole ratio (metal salt:complexing agent) ranging from 1:0.5 to 1:20, in solvent;
adding precipitating agent into the homogeneous metal complex solution to form a slurry;
adding a homogeneous mixture of reducing agent and solvent to perform reducing reaction on the slurry to form metal nanoparticles in a controlled environment under gas purge;
adding capping agent to modify surface properties of the metal nanoparticles; and
washing the metal nanoparticles by washing solvent repeatedly and recovering the metal nanoparticles by phase extraction or centrifugation.

2. The method according to claim 1, wherein the metal nanoparticles comprise monodispersed metal nanoparticles each having a size in a range of 5 nm to 1000 nm.

3. The method according to claim 1, wherein the metal nanoparticles comprise monodispersed metal nanoparticles each having a size in a range of 30 nm to 80 nm.

4. The method according to claim 1, further comprising:
selecting, as the metal salt, metal salts comprising ionic compound with metal cations, metal cations comprising a material selected from at least one of the group consisting of at least one of copper (I) ion, copper (II) ion, silver (I) ion, aluminum (III) ion, nickel (II) ion, zinc (II) ion, tin (II) ion, gold (III) ion and silicon (IV) ion) or a mixture of said ions as cations.

5. The method according to claim 1, further comprising:
selecting, as the metal salt, metal salts comprising ionic compound with metal cations, metal cations comprising a material selected from at least one of the group consisting of at least one of copper (I) ion, copper (II) ion or a mixture of copper cations; and
using counter anions selected from the group consisting of at least one of nitrate ion, sulfate ion, sulfite ion, carbonate ion, bicarbonate ion, chloride ion, fluoride ion, bromide ion, acetate ion, and propionate ion.

6. The method according to claim 1, further comprising selecting, as the complexing agent, an organic acid selected from the group consisting of at least one of tartaric acid, oxalic acid, citric acid; an amine selected from the group selected from ammonia, methylamine, ethylamine, propylamine, isobutylamine; a phosphine selected from the group selected from phosphine, methylphosphine, ethylphosphine, propylphosphine, butylphosphine; a carboxylic acid selected from the group selected from methanoic acid, ethanoic acid, propanoic acid, butaonic acid; a di carboxylic acid selected from the group selected from adiptic acid; and alkathiol, methyl thiol, ethyl thiol, and propyl thiol or a mixture of complexing agent in solvent.

7. The method according to claim 1, further comprising selecting, as the precipitating agent, a metal hydroxide selected from the group consisting of at least one of lithium hydroxide, sodium hydroxide, potassium hydroxide; an inorganic salt selected from the group selected from sodium carbonate, sodium phosphate, and an organic salt selected from the group selected from sodium oxalate, and sodium adipate or a mixture of precipitating agents to form a slurry containing metal ions.

8. The method according to claim 1, further comprising selecting, as the solvent, a material selected from the group consisting of at least one of an alcohol selected from the group selected from methanol, ethanol, isopropyl alcohol; a ketone selected from the group selected from acetone, butanone, pentanone, methyl ethyl ketone; a nitrile selected from the group selected from acetonitrile, propionitrile; a glycol selected from the group selected from ethyl glycol, diethylene glycol; and water or a mixture of solvents to form a homogeneous metal complex solution.

9. The method according to claim 1, further comprising selecting, as the reducing agent, a material selected from the group consisting of at least one of a hydride salt selected from the group selected from sodium borohydride, sodium aluminium hydride, potassium borohydride, potassium aluminium hydroxide, hydrazine, methylhydrazine, hydroxyzine; an alcohol selected from the group selected from methanol, ethanol, propanol; an alkanediol selected from the group selected from ethylene glycol, propylene glycol; and a reducing sugar selected from the group selected from glucose, glyceraldehyde, and galactose or a mixture of the reducing agent, into the slurry to reduce a metal of the metal salt to form the metal nanoparticles under inert gas.

10. The method according to claim 1, further comprising selecting, as the capping agent a material selected from the group consisting of at least one of carboxylic acid selected from nonanoic acid, decanoic acid, unidecanoic acid, dodecanoic acid; a alkylthiol selected from the group selected from hexanethiol, pentathiol, heptanethiol, octanethiol, nonanethiol, decanethiol; a alkylphopshine oxide selected from the group selected from trioctylphosphine oxide, an alkylamine oxide selected from the group selected from decylamine oxide, undecylamine oxide, dodecylamine oxide; an alkyl betaine selected from the group selected from methyl decyl betaine; and the lithium, sodium, or potassium salt of carboxylic acid; polymer comprising a material selected from the group consisting of sodium carboxymethyl cellulose, sodium alginate, poly(acrylic acid sodium salt), and polyvinylpyrrolidone or a mixture of capping agents added to the reaction mixture.

11. The method according to claim 1, further comprising selecting, as the washing solvent a solvent selected from the group consisting of at least one of alcohol selected from the group selected from methanol, ethanol, isopropyl alcohol, a ketone selected from the group selected from acetone, butanone, pentanone, methyl ethyl ketone; a nitrile selected from the group selected from acetonitrile, propionitrile; water; an alkane selected from the group selected from hexane, heptane, octane, nonane, decane; alkyl carboxylate; and ethylene ether.

12. The method according to claim 1, further comprising selecting, as the controlled environment, an environment with controlled temperature range from room temperature to the boiling point of the solvent, and controlled pressure ranged from 0.5 atm to 4 atm.

13. The method according to claim 1, further comprising selecting, as the gas is an inert gas selected from the group selected from argon, nitrogen, and a reducing gas selected from the group selected from methane, hydrogen, and nitrogen.

14. The method according to claim 1, further comprising selecting, as the surface properties, the hydrophobicity and ability to resist oxidation from oxygen.

* * * * *